(12) United States Patent
Robinson et al.

(10) Patent No.: US 10,349,489 B2
(45) Date of Patent: Jul. 9, 2019

(54) ADAPTABLE SKYLIGHT

(71) Applicant: Textron Aviation Inc., Wichita, KS (US)

(72) Inventors: Michael Scott Robinson, Cheney, KS (US); Frank Joseph Rowe, Wichita, KS (US); Todd Alan Thisius, Cheney, KS (US)

(73) Assignee: Textron Innovation, Inc., Providence, RI (US)

( * ) Notice: Subject to any disclaimer, the term of this patent is extended or adjusted under 35 U.S.C. 154(b) by 17 days.

(21) Appl. No.: 15/795,786

(22) Filed: Oct. 27, 2017

(65) Prior Publication Data
US 2018/0124899 A1    May 3, 2018

Related U.S. Application Data

(60) Provisional application No. 62/413,694, filed on Oct. 27, 2016.

(51) Int. Cl.
*H05B 37/02* (2006.01)
*B64C 1/14* (2006.01)
(Continued)

(52) U.S. Cl.
CPC ....... *H05B 37/0218* (2013.01); *B64C 1/1484* (2013.01); *B64D 11/00* (2013.01); *E04D 13/03* (2013.01); *F21S 10/023* (2013.01); *F21V 14/003* (2013.01); *F21V 23/003* (2013.01); *G02F 1/1334* (2013.01); *G02F 1/13318* (2013.01);
(Continued)

(58) Field of Classification Search
CPC .............. B64C 1/1484; B64D 11/00; B64D 2011/0038; F21L 4/00; F21L 4/02; H05B 37/02; H05B 37/0218; H05B 33/0872; H05B 33/086; F21Y 2115/10; F21V 3/00; F21V 9/02; F21V 14/003; F21V 23/003
See application file for complete search history.

(56) References Cited

U.S. PATENT DOCUMENTS 5,896,712 A * 4/1999 Chao ................... E04D 13/03
52/200
7,000,869 B2 * 2/2006 Sankrithi .............. B64C 1/0009
244/119
(Continued)

*Primary Examiner* — Haissa Philogene
(74) *Attorney, Agent, or Firm* — Erise IP, P.A.

(57) ABSTRACT

An adaptable skylight includes a frame facing an interior of an enclosure having an opening for allowing light to pass. An opacity-control pane adjacent the opening allows a variable amount of light to pass, and an artificial light source illuminates the frame. An aircraft skylight assembly includes a variable pane, an artificial light source for illuminating portions of the skylight assembly, and a controller configured for adjusting an amount of external light transmission through the variable pane and an amount of artificial light illumination. An internal ambiance lighting system includes the adaptable skylight having a dimmable pane for providing transmission of a variable amount of external light into an enclosure, the artificial light illuminates the frame surrounding the adaptable skylight, and the controller automatically adjusts external light transmission through the adaptable skylight and illumination of the frame based on a lighting preference.

23 Claims, 8 Drawing Sheets

(51) Int. Cl.
*B64D 11/00* (2006.01)
*F21V 14/00* (2018.01)
*G02F 1/133* (2006.01)
*G02F 1/1334* (2006.01)
*F21V 23/00* (2015.01)
*E04D 13/03* (2006.01)
*F21S 10/02* (2006.01)
*F21Y 115/10* (2016.01)
*F21S 11/00* (2006.01)
*F21W 121/00* (2006.01)
*F21Y 113/13* (2016.01)

(52) U.S. Cl.
CPC ....... *B64D 2011/0038* (2013.01); *F21S 11/00* (2013.01); *F21W 2121/00* (2013.01); *F21Y 2113/13* (2016.08); *F21Y 2115/10* (2016.08); *G02F 2001/13312* (2013.01)

(56) References Cited

U.S. PATENT DOCUMENTS

| | | | | |
|---|---|---|---|---|
| 7,296,388 B2* | 11/2007 | Valentz | ............... | E04D 13/0315 52/200 |
| 7,535,614 B1* | 5/2009 | Tapley | ............... | B60J 3/04 345/105 |
| 7,874,513 B1* | 1/2011 | Smith | ............... | B64C 11/001 244/12.4 |
| 8,726,968 B2* | 5/2014 | Sievers | ............... | B64C 1/1484 160/90 |
| 9,010,959 B2* | 4/2015 | Edelson | ............... | F21L 4/02 362/157 |
| 9,894,729 B2* | 2/2018 | Forbis | ............... | H05B 33/0872 |
| 2005/0081462 A1* | 4/2005 | Mulford | ............... | E04D 13/033 52/200 |

* cited by examiner

ADAPTABLE SKYLIGHT

CROSS-REFERENCE TO RELATED APPLICATIONS

This application claims the benefit of U.S. Provisional Application No. 62/413,694 entitled "Adaptable Skylight" filed on, Oct. 27, 2016, which is herein incorporated by reference in its entirety.

BACKGROUND

1. Field

Embodiments of this disclosure relate generally to skylights, such as may be utilized on a vehicle such as an aircraft.

2. Description of the Related Art

Skylights are used to provide external light into an interior area, such as the interior of a dwelling or a vehicle. Skylights of the prior art typically consist of a window-type opening without any control over the amount or type of light that enters the interior. In order to control light transmission, some skylights of the prior art use a mechanical shade to control the light transmission. However, these skylights are also disadvantageous because they still allow a high intensity of light through, just in a smaller area.

SUMMARY

In an embodiment, an adaptable skylight for an enclosed area in a habitable space in a vehicle is provided. The adaptable skylight includes a frame defining an opening for allowing light to pass, an opacity-control pane located in the opening, the opacity-control pane allowing for a variable amount of light to pass through the opening in the frame.

In another embodiment, an aircraft skylight assembly providing variable external and artificial light is provided. The aircraft skylight assembly includes a variable pane for varying an amount of external light transmission, an artificial light source for illuminating portions of the skylight assembly, and a controller configured for adjusting an amount of external light transmission through the variable pane and for adjusting an amount of artificial light illumination of the skylight assembly.

In yet another embodiment, an internal ambiance lighting system is provided. The internal ambiance lighting system includes an adaptable skylight having a dimmable pane for providing transmission of a variable amount of external light into an enclosure, an artificial light configured to illuminate a frame surrounding the adaptable skylight, a light sensor for measuring an intensity of light. The system further includes a controller configured to automatically adjust external light transmission through the adaptable skylight and illumination of the frame using the artificial light based on a lighting preference and a measured intensity of light from the light sensor.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Currently available skylights are undesirable for use in aircraft and in many other applications. Currently available skylights cannot control the degree to which light travels therethrough which can create an unpleasant environment for pilots, passengers, drivers, and other crew. Embodiments of the disclosure overcome these limitations by controlling the amount of light that is allowed to come through the skylight and providing secondary lighting to maintain a relatively constant and pleasant lighting in the interior.

Figure 1:
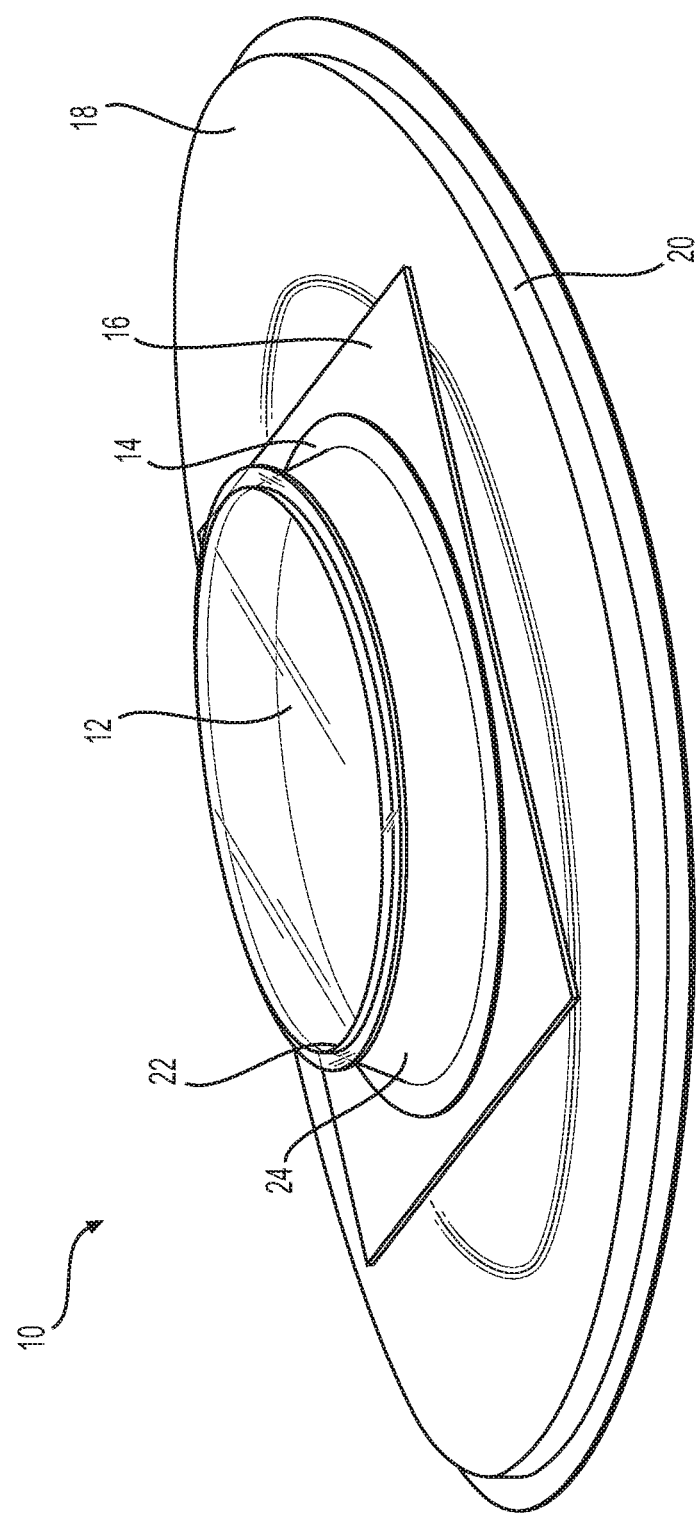
FIG. 1 shows a perspective view of an uninstalled adaptable skylight, in an embodiment.
Figure 2:
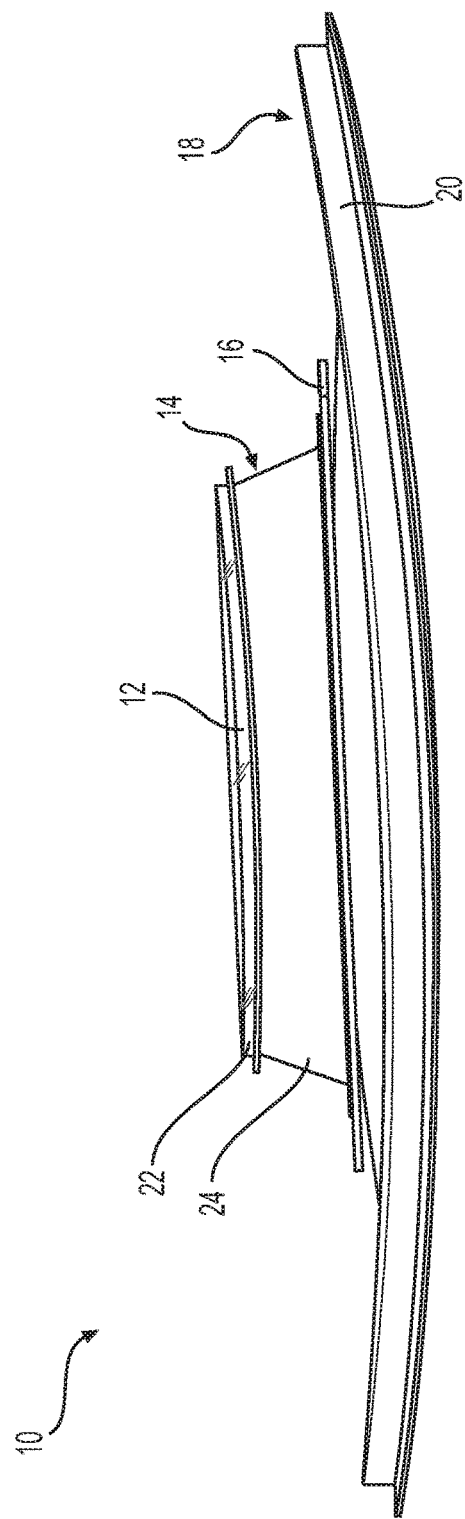
FIG. 2 shows a perspective side view of the adaptable skylight of FIG. 1.
Figure 5:
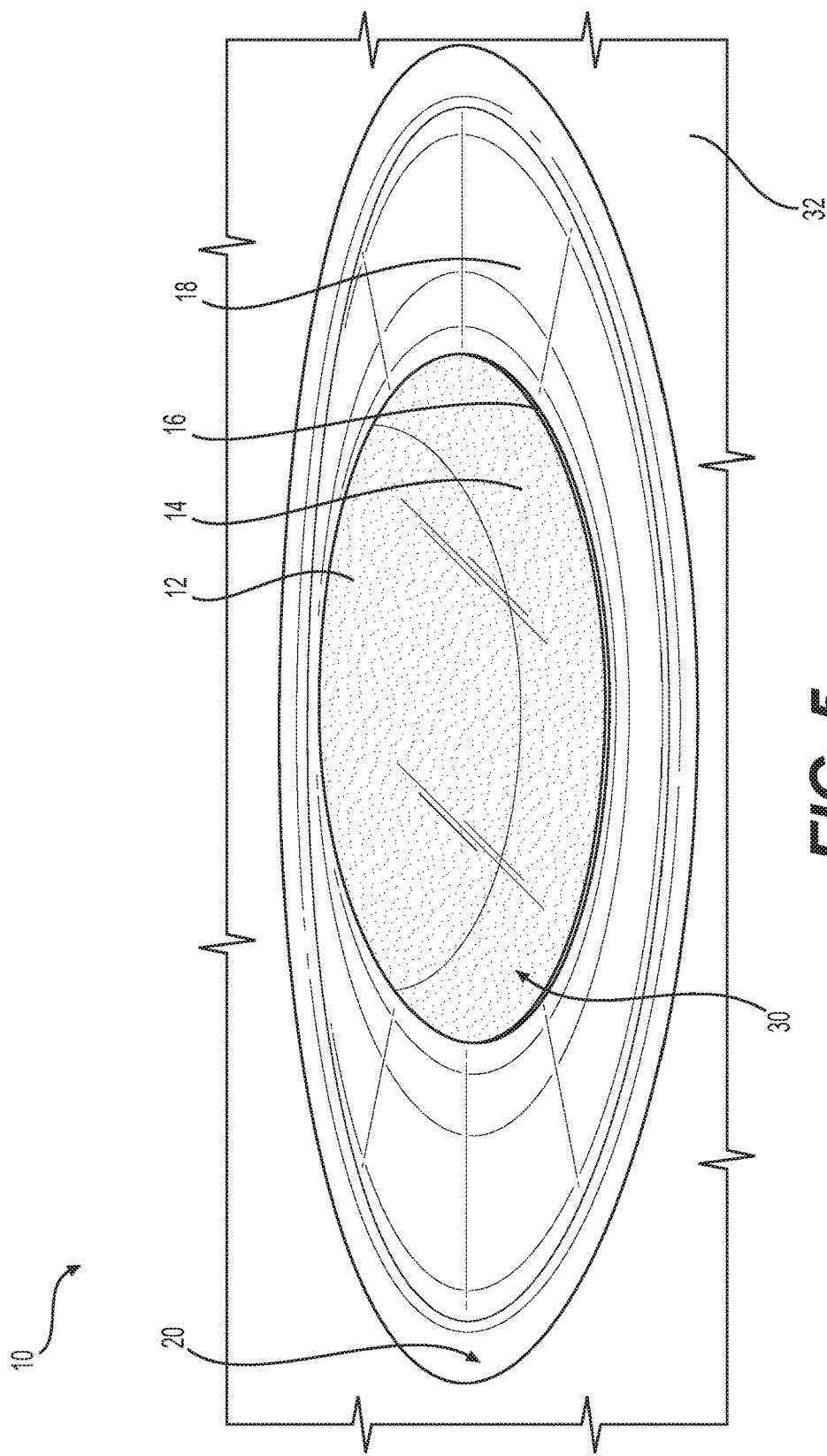
FIG. 5 shows a photographic view of an adaptable skylight installed into an aircraft, shown in a relatively clear state, in an embodiment.
Figure 6:
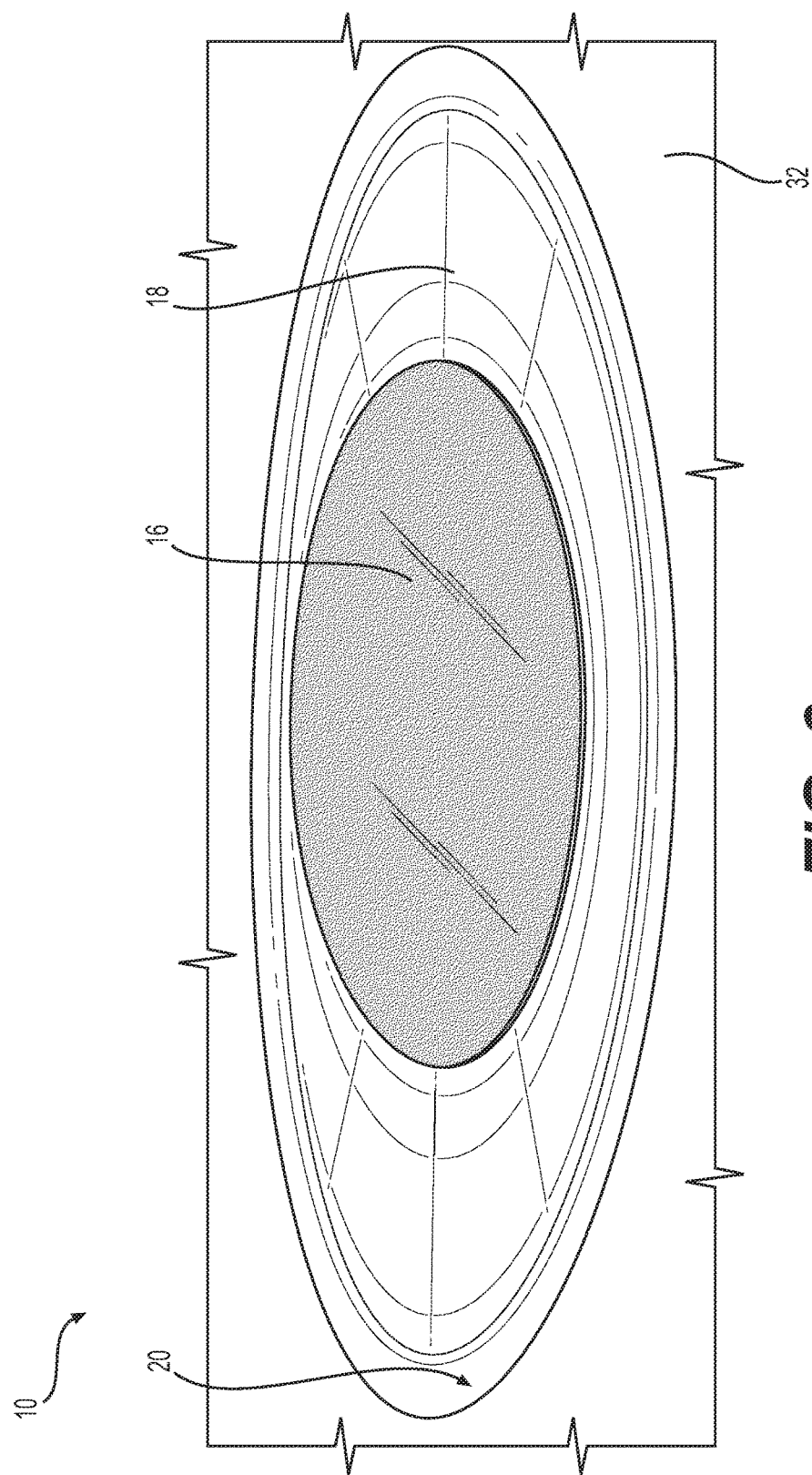
FIG. 6 shows a photographic view of the adaptable skylight of FIG. 5, shown in an occluded state.
Figure 7:
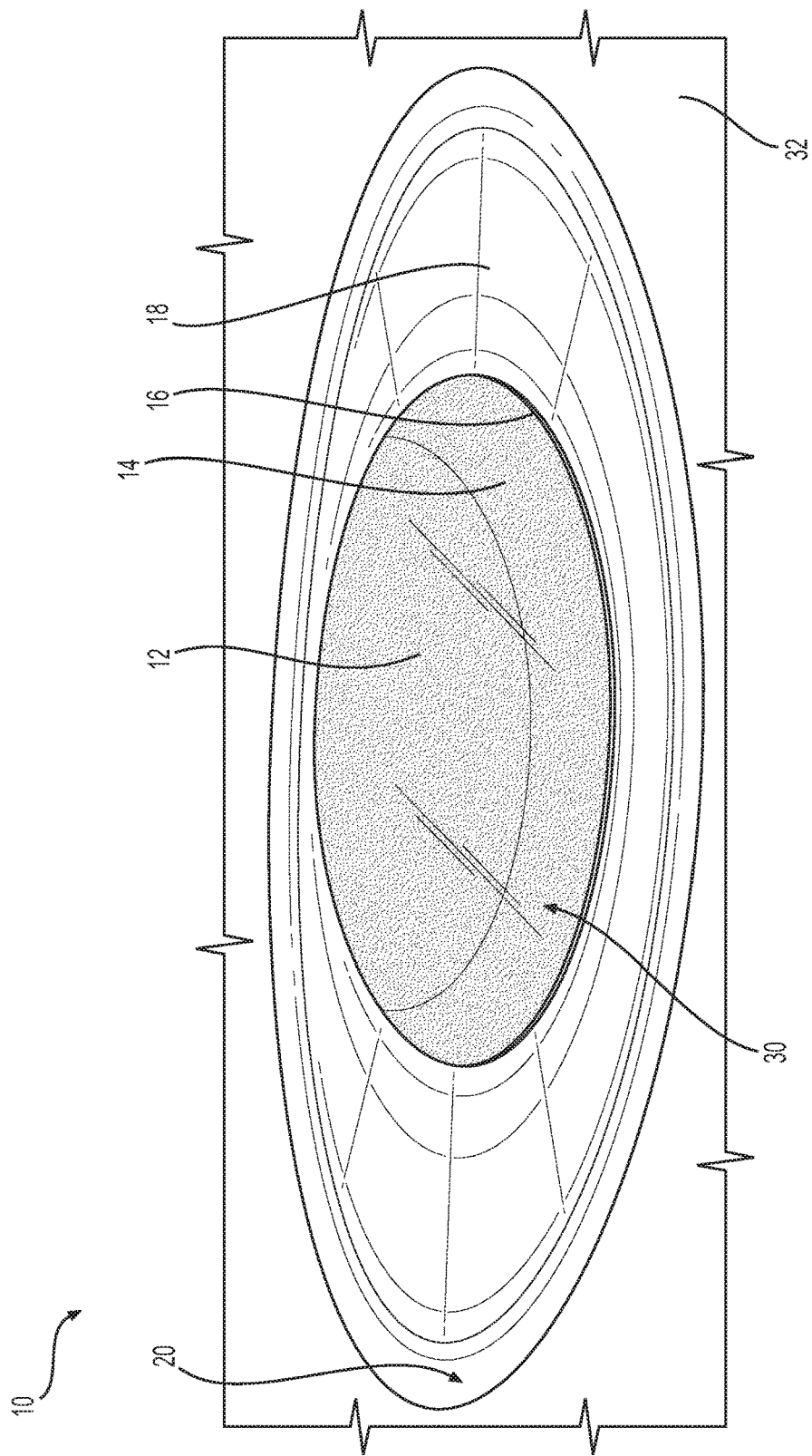
FIG. 7 shows a photographic view of the adaptable skylight of FIG. 5 shown in a dimmed state.

FIG. 1 shows a perspective view of an exemplary adaptable skylight 10 uninstalled. In certain embodiments, the adaptable skylight 10 comprises an exterior pane 12, a recess housing 14, a variable pane 16, and a frame 18. In some embodiments, the adaptable skylight 10 includes the recess housing 14 between the exterior pane 12 and the variable pane 16, with the frame 18 disposed below the variable pane 16, as best illustrated in FIG. 2. Generally, the adaptable skylight 10 provides the desired amount of light into an enclosed area in a habitable space in a vehicle. In certain embodiments, the adaptable skylight 10 provides a desired amount of light through a main cabin panel 32 (as shown in FIGS. 5-7) into the interior of an enclosure (e.g., a vehicle or dwelling). Light enters the adaptable skylight 10 through the exterior pane 12 and passes through a void 30 in the recess housing 14. The variable pane 16 optionally allows all, most, some, or none of the light to pass therethrough.

The exterior pane 12 is, in embodiments, substantially flush with an exterior surface of the vehicle or dwelling (not shown). The exterior pane 12 includes an L-shaped peripheral ridge 22 that is received in a matching hole of the enclosure (e.g., the exterior skin of the aircraft, not shown). The exterior pane 12 is substantially transparent so as to allow external light to enter the adaptable skylight 10. The exterior pane 12 may further have a curved shaped to match the curvature of the skin of the exterior of the vehicle or dwelling. In some embodiments, the exterior pane 12 is substantially elliptical, as illustrated. In other embodiments, the exterior pane 12 may be circular, rectangular, or other shape, and in some of those embodiments a correspondingly shaped peripheral ridge having an L-shaped cross section is used.

The recess housing 14 includes an annular wall 24 that provides a stand-off between the exterior pane 12 and the variable pane 16. The recess housing 14 is therefore disposed between a lower surface of the exterior pane 12 and an upper surface of the variable pane 16. The annular wall 24 may be a conical frustum shape (e.g., a cutoff cone) such that a lower portion of the annular wall 24 presents a larger diameter than an upper portion of the annular wall 24.

In certain embodiments, the recess housing 14 provides a void 30 (see FIGS. 5-7) within the annular wall 24. The void 30 may be filled with a vacuum, air, another gas, or another substantially transparent substance. The recess housing 14 may also be elliptical or other shape. The trapped vacuum/air/gas within the void 30 provides thermal insulation such that heat transfer through the skylight is reduced. The desired clarity created with respect to the provision of external light prevents the introduction of any conventional insulation, which likely will be in use in the areas surrounding the recess housing 14 and skylight 10.

In certain embodiments, the variable pane 16 is disposed between the recess housing 14 and the frame 18. In other embodiments, different orientations for variable pane 16 might be used. For example, in some embodiments the variable pane 16 could be disposed between exterior pane 12 and the upper surfaces of the recess housing 14. In still other embodiments, the variable pane 16 could be disposed within the recess housing 14, such that the annular wall 24 extends above and below the variable pane 16.

In some embodiments, the variable pane 16 is substantially rectangular, as shown in FIG. 1; however, the shape of the variable pane 16 can be any shape necessary to accommodate the shape between the recess housing 14 and the frame 18. The frame 18 is for example a valance panel (as discussed below and shown in FIGS. 5-7) that defines an opening for presenting the variable pane 16 as an elliptical (or other) shape to an observer in the interior. The frame 18 includes a peripheral ridge having an L-shaped cross section that forms a vertical wall portion 20. On an inside perimeter of the vertical wall portion 20 is disposed an artificial light source, as further described below in connection with FIG. 4.

The variable pane 16 is an opacity-control pane configured to alter opacity and/or other characteristics so as to control the amount of light that is permitted to be passed therethrough. In some embodiments, the variable pane 16 is a suspended particle device (SPD), electrochromatic device (ECD), Organic LED (OLED) or other electronically dimmable/reactive window. The amount of light allowed to pass through the variable pane 16 may be determined automatically (based upon light sensors or other information) or through a manual user input (as discussed below). The variable pane 16 may also be configured to reduce the heat transmitted into the interior by e.g., utilizing UV protective and heat reducing films. This may be useful for maintaining a certain environment within the interior. Further, the variable pane 16 may be configured to provide privacy for the occupants of the interior, so as to prevent persons or cameras on the exterior from observing the interior.

In certain embodiments, the variable pane 16 includes an opaque layer that is electrically controllable to transition between opaque and transparent. For example, the opaque layer may be a thin film embedded in the variable pane that appears opaque when electrically powered and becomes transparent when unpowered. The thin film is for example a polymer disperse liquid crystal (PDLC) that provides a complete black out (see e.g., FIG. 6) when electrically powered to prevent transmission of external light and provide privacy.

In certain embodiments, the variable pane 16 may further comprise a protective pane. The protective pane is disposed between the variable pane 16 and the frame 18 (e.g., below the variable pane 16). The protective pane is substantially transparent. The protective pane prevents or reduces damage to the variable pane 16 due to impacts from the interior.

Figure 3:
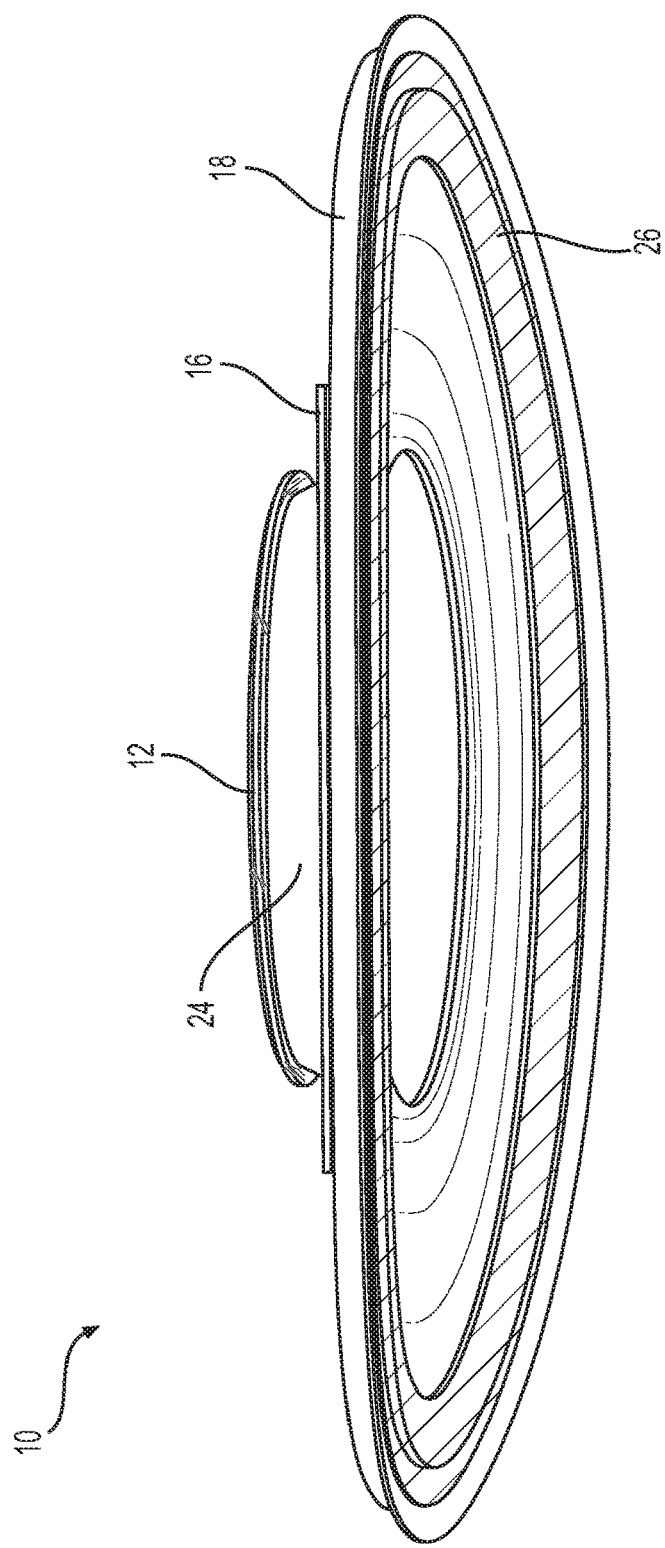
FIG. 3 shows another perspective side/bottom view of the adaptable skylight of FIG. 1.

FIG. 3 shows a perspective view of the underside of adaptable skylight 10. A bottom ring 26 covers an underside of the frame 18 around its periphery and conceals the light source.

Figure 4:
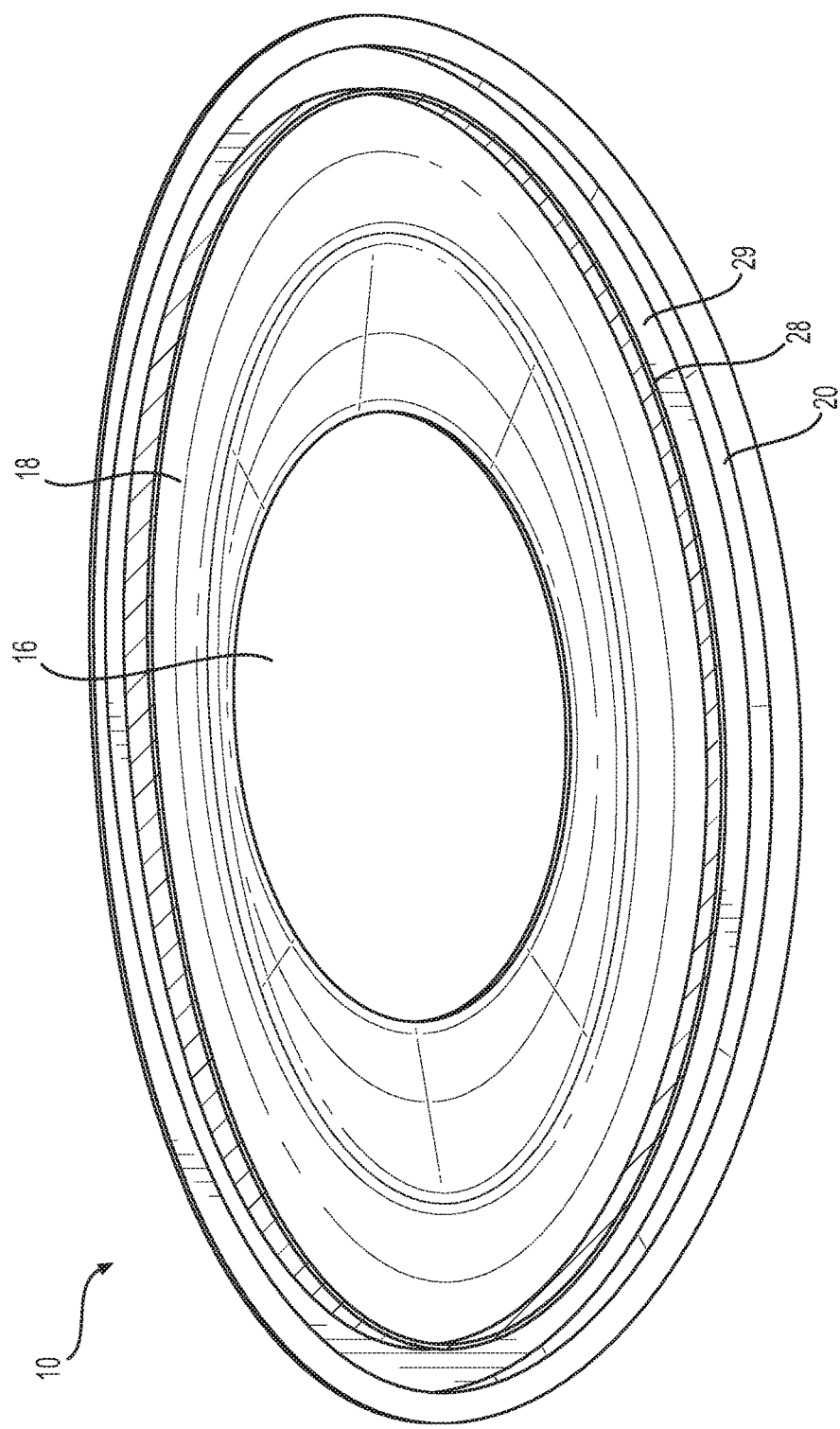
FIG. 4 shows a bottom perspective view of the adaptable skylight of FIG. 1.

FIG. 4 shows the underside of adaptable skylight 10 with bottom ring 26 removed. An inner side of the vertical wall portion 20 of the frame 18 is partially in view. Also in view are a light lens 28 and a groove 29. The groove 29 is formed between the vertical wall portion 20 and the light lens 28. The light source (not shown) mounts to the inner side of the vertical wall portion 20 and shines through the light lens illuminating the underside of the frame 18. The light lens smooths out the light from the light source. With the bottom ring 26 in place (see FIG. 3), light from the light source passes inward through the light lens and washes up the curved portion of the frame 18.

In certain embodiments, the light source is a set of light emitting diodes ("LEDs") or other electrically-powered source of light. Each LED of the set of LEDs may be oriented upward or diagonally upward toward the frame 18. Combined with the light lens, a distribution of light is generated so as to provide a substantially even and aesthetically pleasing lighting effect, as shown in FIGS. 5-7. Further, the LEDs may provide white light or colored light, and individual LEDs within the set may be of different colors to enable displaying a variety of colors for aesthetic effect (e.g., ambiance and mood lighting).

The frame 18 is curved and otherwise configured to be installed into an opening in a main cabin panel 32, as illustrated in FIGS. 5-7. The main cabin panel 32 is for example an overhead panel having a curved or non-flat shape facing an interior of the main cabin. The frame 18 provides a surface upon which an artificial light source may shine. This provides a desirable "up-wash" effect for the artificial light. The light source may therefore be used to provide additional light to complement the external light (if any) being transmitted through the variable panel 16. The frame 18 slopes generally upward from an exterior perimeter to the inner opening. In some embodiments, the upward slope may be generally linear or arcuate.

FIGS. 5-7 show photographic examples of the adaptable skylight 10. In certain embodiments, the light source provides an ambience lighting effect to the adaptable skylight 10. The ambience lighting effect may be utilized in addition to or in place of the external light provided through the variable pane 16. The light source may provide light in conjunction with or independently of the external light provided throughout the variable pane 16.

In certain embodiments, the light source provides a variable amount of light based upon any of various conditions. For example, the amount of light produced by the light source may be based upon the amount of light being received above the variable pane 16, the amount of light being transmitted through the variable pane 16, an amount of light within the interior of the aircraft or dwelling, a manual setting selected by a user (as discussed below), or other considerations in providing a desirable light level within the interior.

FIGS. 5-7 depict the adaptable skylight 10 installed in an exemplary aircraft. In certain embodiments, the adaptable skylight 10 is complementary in size in shape to an opening in the main cabin panel 32. The main cabin panel 32 is a component of a cabin of the aircraft. It should be appreciated that other embodiments may be configured to fit within openings in other structures and surfaces, such as ceilings, walls, and the other barriers between an exterior area and an interior enclosure.

The opening may be elliptically shaped, as the frame 18 and the opening therein are, as well as the recess housing 14 and the exterior pane 12. As with the other components, in some embodiments, the major axis of the ellipse shape may be oriented parallel to a fore-aft central axis of the aircraft, as shown. In other embodiments, the major axis of the ellipse is perpendicular to the fore-aft central axis of the aircraft, or it may be at another orientation.

FIG. 5 shows a photographic view of an adaptable skylight 10 installed into an aircraft, shown in a clear state. In the clear state, the variable pane 16 allows substantially all of the light to pass therethrough. The clear state may be utilized while the light from the exterior is less intense or when more interior lighting is desired.

FIG. 6 shows a photographic view of the adaptable skylight of FIG. 5, shown in an occluded state. In the occluded state, the variable pane 16 prevents substantially all of the light from passing therethrough. The occluded state may be utilized when light from the exterior is undesired or unnecessary, such as to help passengers sleep or provide privacy.

FIG. 7 shows a photographic view of the adaptable skylight of FIG. 5 shown in a dimmed state. In the dimmed state, the variable pane 16 allows a varying intermediate amount of the light to pass therethrough. The dimmed state may be utilized when light from the exterior is desired, but the clear state would allow light that is too intense. For example, if in the clear state bright sunlight is directly on a passenger this may be undesirable, so the adaptable skylight 10 may (automatically or upon manual input) change to the dimmed state so as to still receive light but to lessen the intensity on the passenger.

It should be appreciated that the light produced by the light source is substantially constant throughout the depicted FIGS. 5-7, but that in some embodiments the light level may be varied (e.g., in relation to the state of the variable pane 16). For example, in the clear state, light from the light source may be less needed, while in the dimmed state the light from the light source may replace the light blocked by the variable pane 16 less intensely.

Figure 8:
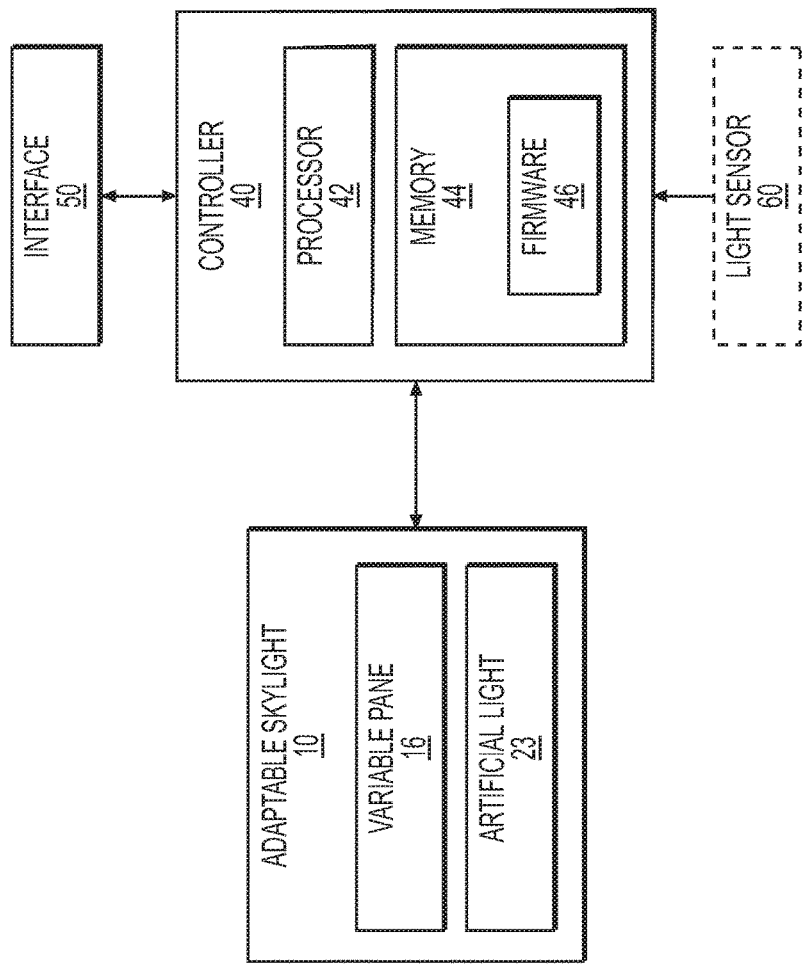
FIG. 8 is a block diagram of an adaptable skylight system for providing control of the adaptable skylight of FIGS. 1 and 5, in an embodiment.

FIG. 8 is a block diagram of an exemplary adaptable skylight system 60 for providing control of the adaptable skylight 10. The adaptable skylight 10, which includes the variable pane 16 and an artificial light 23 (e.g., the light source), is configured to receive instructions from a controller 40. The controller 40 includes a memory 44, including a non-transitory medium for storing firmware 46, and a processor 42 for executing instructions of the firmware 46. The memory 44 in some embodiments is a memory system that includes both transitory memory such as RAM and non-transitory memory such as, ROM, EEPROM, Flash-EEPROM, magnetic media including disk drives, and optical media. The memory 44 stores the firmware 46 as machine readable instructions executable by the processor 42. An optional interface 50 allows a user to control various settings and configurations of the adaptable skylight 10. Interface 50 may include one or more of a keyboard, mouse, touch screen, and microphone such that a user may control various settings by hand or by voice-activation. A light sensor 60 may optionally be used to provide light intensity information to the controller 40. For example, the light sensor 60 may include one or more sensors to detect light intensity inside and/or outside the enclosure and/or an amount of light transmission through the variable pane 16. Communication between the controller 40, the interface 50, the light sensor 60, and the adaptable skylight 10 may be by a wired and/or wireless communication medium.

In certain embodiments, the interface 50 is a graphic user interface (GUI) that provides the user with the ability to control specific settings of the adaptable skylight 10. For example, the user may select the degree to which the variable pane 16 allows light to pass therethrough. As another example, the user may select the amount of light created by the light source. The user may be able to set desired light amounts, general light settings, and the like. The controller 40 may determine an amount of light transmission through the variable pane 16 (e.g., via the light sensor 60), an amount of light generated by the artificial light 23, and a desired setting by the user. The controller 40 may then instruct the variable pane 16 to change the setting, instruct the artificial light 23 to increase or decrease brightness, or a combination thereof to achieve the desired setting by the user.

In certain embodiments, the controller 40 may automatically adjust the amount of external light transmission through variable pane 16 and the amount of artificial light illumination provided by artificial light 23 based on at least one of an ambiance setting, a measured intensity of exterior light, a measured intensity of interior light, a time of day, a phase of flight, a desired interior intensity of light, and an amount of light transmission through the variable pane 16.

In certain embodiments, light preference settings may be selected by the user that resemble one of night, dawn, dusk, or mid-day. Other lighting preferences may provide lighting based on an activity, such as reading, watching a movie, sleeping, eating, etc. The light preferences may be achieved by light transmission from the adaptable skylight 16 coupled with light from the artificial light 23 and with other sources of light in the enclosure (e.g., windows).

It should be appreciated that the depiction and description of embodiments of the disclosure in relation to an aircraft are merely exemplary. Embodiments of the disclosure may be directed to or configured to be utilized with any number of other fields. For example, embodiments of the disclosure may be utilized in an automobile as an adaptable skylight 10 that protects the driver and passengers from excess sunlight. As another example, embodiments of the disclosure may be configured to be installed in a house or other dwelling to prevent excessive light and provide a more even distribution of light within the house or other dwelling.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. An adaptable skylight for an enclosed area in a habitable space in a vehicle, the skylight comprising:
a frame in the vehicle defining an opening for allowing light to pass;
an opacity-control pane located in the opening, the opacity-control pane allowing for a variable amount of light to pass through the opening in the frame.

2. The skylight of claim 1, comprising:
an artificial light source configured to illuminate a portion of the frame.

3. The adaptable skylight of claim 1, wherein the enclosed area is a passenger cabin of an aircraft.

4. The adaptable skylight of claim 1, further comprising an exterior pane disposed adjacent the opacity-control pane, the exterior pane facing an exterior of the enclosed area for receiving external light.

5. The adaptable skylight of claim 1, wherein the artificial light source is disposed circumferentially around the frame.

6. The adaptable skylight of claim 5, wherein the artificial light source is angled diagonally upward and inward toward the frame.

7. The adaptable skylight of claim 1, further comprising a light lens configured for smoothing light from the artificial light source.

8. The adaptable skylight of claim 1, further comprising a recess housing disposed between an exterior pane and the variable pane.

9. The adaptable skylight of claim 8, the recess housing further comprising a annular wall having a conical frustum shape with a lower portion adjacent the variable pane and an upper portion adjacent the exterior pane, wherein the lower portion has a larger internal diameter than the upper portion.

10. The skylight of claim 1, comprising:
a control system on the vehicle, the control system selectively changing the opacity of the opacity-control pane.

11. An adaptable skylight for an enclosed area in a habitable space in a vehicle, the skylight comprising:
a frame defining an opening for allowing light to pass;
an opacity-control pane located in the opening, the opacity-control pane allowing for a variable amount of light to pass through the opening in the frame;
a void formed within the recess housing between the variable pane and exterior pane, wherein the void provides thermal insulation between the interior and exterior of the enclosed area.

12. The adaptable skylight of claim 11, wherein the void is used to form a vacuum for providing thermal insulation.

13. An aircraft skylight assembly providing variable external and artificial light, comprising:
a variable pane for varying an amount of external light transmission;
an artificial light source for illuminating portions of the skylight assembly; and
a controller configured for adjusting an amount of external light transmission through the variable pane and for adjusting an amount of artificial light illumination of the skylight assembly.

14. The skylight assembly of claim 13, the controller being configured to automatically adjust the amount of external light transmission and the amount of artificial light illumination based on at least one of an ambiance setting, a measured intensity of exterior light, a measured intensity of interior light, a time of day, a phase of flight, and a desired interior intensity of light.

15. The skylight assembly of claim 13, further comprising a light sensor for detecting an intensity of light, the light sensor being communicatively coupled with the controller for determining the amount of light transmission and the amount of light illumination.

16. The skylight assembly of claim 13, further comprising an interface communicatively coupled to the controller for enabling a user to manually adjust the amount of external light transmission and the amount of artificial light illumination.

17. An internal ambiance lighting system, comprising:
an adaptable skylight having a dimmable pane for providing transmission of a variable amount of external light into an enclosure;
an artificial light configured to illuminate a frame surrounding the adaptable skylight;
a light sensor for measuring an intensity of light; and
a controller configured to automatically adjust external light transmission through the adaptable skylight and illumination of the frame using the artificial light based on a lighting preference and a measured intensity of light from the light sensor.

18. The internal ambiance lighting system claim 17, wherein the lighting preference is configured to resemble one of night, dawn, dusk, or mid-day.

19. The internal ambiance lighting system claim 17, wherein the lighting preference provides lighting for an activity selected from the group consisting of reading, watching a movie, sleeping, and eating.

20. The internal ambiance lighting system of claim 17, wherein the lighting preference couples external light transmission from the adaptable skylight with illumination of the frame using the artificial light based on other sources of light in the enclosure.

21. The internal ambiance lighting system of claim 17, wherein the controller is configured to automatically adjust an amount of external light transmission and an amount of artificial light illumination based on at least one of an ambiance setting, a measured intensity of exterior light, a measured intensity of interior light, a time of day, a phase of flight, and an amount of light transmission through the dimmable pane.

22. The internal ambiance lighting system of claim 17, wherein the dimmable pane further comprises an opaque layer that is electrically controllable by the controller to transition between opaque and transparent.

23. An adaptable skylight for an enclosed area in a habitable space in a vehicle, the skylight comprising:
a frame defining an opening for allowing light to pass;
an opacity-control pane located in the opening, the opacity-control pane allowing for a variable amount of light to pass through the opening in the frame wherein the variable amount of light allowed to pass through the opening in the frame by the opacity-control pane includes a plurality of levels, a first level of opacity being substantially opaque, a second level of opacity being substantially transparent, and a third level of opacity being between the first and second levels of opacity.

* * * * *

UNITED STATES PATENT AND TRADEMARK OFFICE
CERTIFICATE OF CORRECTION

PATENT NO. : 10,349,489 B2
APPLICATION NO. : 15/795786
DATED : July 9, 2019
INVENTOR(S) : Michael Scott Robinson et al.

It is certified that error appears in the above-identified patent and that said Letters Patent is hereby corrected as shown below:

On the Title Page

Item (72) List all five inventors as:
Michael Scott Robinson, of Cheney, Kansas
Frank Joseph Rowe, of Wichita, Kansas
Todd Alan Thisius, of Cheney, Kansas
Jeremy Joseph Kneuper, of Hesston, Kansas
Larry Ayres, of Haysville, Kansas Signed and Sealed this
Eighth Day of October, 2024

Katherine Kelly Vidal
*Director of the United States Patent and Trademark Office*